(12) United States Patent
Birru et al.

(10) Patent No.: US 6,898,614 B2
(45) Date of Patent: *May 24, 2005

(54) ROUND-OFF ALGORITHM WITHOUT BIAS FOR 2'S COMPLEMENT DATA

(75) Inventors: Dagnachew Birru, Yorktown Heights, NY (US); Gennady Turkenich, Hillsdale, NY (US); David Koo, Carmel, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 719 days.

This patent is subject to a terminal disclaimer.

(21) Appl. No.: 09/821,178

(22) Filed: Mar. 29, 2001

(65) Prior Publication Data

US 2002/0174156 A1 Nov. 21, 2002

(51) Int. Cl.[7] .................................................. G06F 7/38
(52) U.S. Cl. ....................................... 708/551; 708/497
(58) Field of Search ................................ 708/306, 496, 708/497, 550, 551

(56) References Cited

U.S. PATENT DOCUMENTS

| | | | |
|---|---|---|---|
| 4,229,800 A | | 10/1980 | Gregorian et al. |
| 4,648,058 A | * | 3/1987 | Masumoto ................... 708/551 |
| 4,977,535 A | * | 12/1990 | Birger .......................... 708/497 |
| 5,233,605 A | | 8/1993 | Maher et al. |
| 5,500,812 A | | 3/1996 | Saishi et al. |
| 5,935,201 A | | 8/1999 | Costa et al. |
| 6,055,555 A | * | 4/2000 | Boswell et al. .............. 708/551 |

FOREIGN PATENT DOCUMENTS

WO          9110189 A1      7/1991

* cited by examiner

Primary Examiner—Chuong Dinh Ngo

(57) ABSTRACT

A round off mechanism maintains a mean value of the operand while rounding twos complement binary data. Positive data values are incremented at the first discard bit prior to truncation of the discard bits, as are negative data values having a one within the most significant discard bit and at least one other discard bit. The discard bits are simply truncated for all other negative data values.

20 Claims, 2 Drawing Sheets

ROUND-OFF ALGORITHM WITHOUT BIAS FOR 2'S COMPLEMENT DATA

TECHNICAL FIELD OF THE INVENTION

The present invention is directed, in general, to rounding mechanisms within devices or programs performing arithmetic or logical operations utilizing twos complement binary data and, more specifically, to rounding mechanisms preserving the mean value of the operand rather than biasing the rounded result for mathematical accuracy in future operations.

BACKGROUND OF THE INVENTION

Most contemporary rounding mechanisms, whether implemented in hardware or software, arise in computational situations such as performance of mathematical (e.g., floating point) calculations, and therefore focus on mathematical accuracy in the result. Such rounding mechanisms typically introduce a round-off induced offset or bias in the result designed to ensure that "correct" or mathematically accurate results will be obtained in future calculations involving the rounded result.

In digital signal processing, however, mathematical accuracy is not necessarily the chief concern. For example, constellation diagrams (an two axis plot of the data states of phase or phase-amplitude encoded digital data) are commonly employed in wireless telecommunications systems utilizing, for instance, quad-state phase-shift keyed (QPSK) or quadrature amplitude modulation (QAM) signals.

In such circumstances, maintaining a mean value of the bipolar data stream as a whole (or of the constellation in the case of coded data) is of primary importance, while tolerance for round-off induced offset or bias is low. An unintentional distortion of the mean value could result in errors within the receiver due to an introduced offset in the processed, received data symbol constellation versus the symbol constellation diagram for a priori known and expected symbols.

There is, therefore, a need in the art for mean value preservation during round off of twos complement binary data.

SUMMARY OF THE INVENTION

To address the above-discussed deficiencies of the prior art, it is a primary object of the present invention to provide, for use in receiver, a round off mechanism for maintaining a mean value of the operand while rounding twos complement binary data. Positive data values are incremented at the first discard bit prior to truncation of the discard bits, as are negative data values having a one within the most significant discard bit and at least one other discard bit. The discard bits are simply truncated for all other negative data values.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
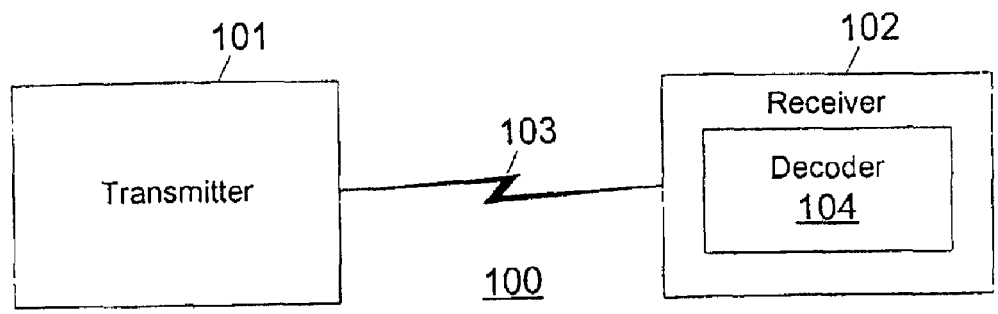
FIG. 1 depicts a wireless data transmission system in which round off without bias for twos complement binary data is implemented according to one embodiment of the present invention.
Figure 2:
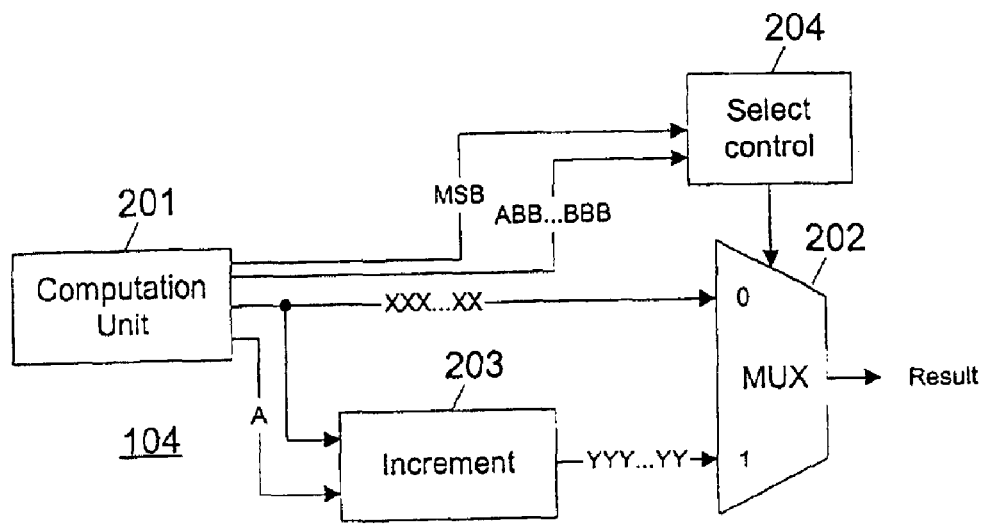
FIG. 2 illustrates in greater detail a circuit for performing round off without bias on twos complement binary data according to one embodiment of the present invention.
Figure 3:
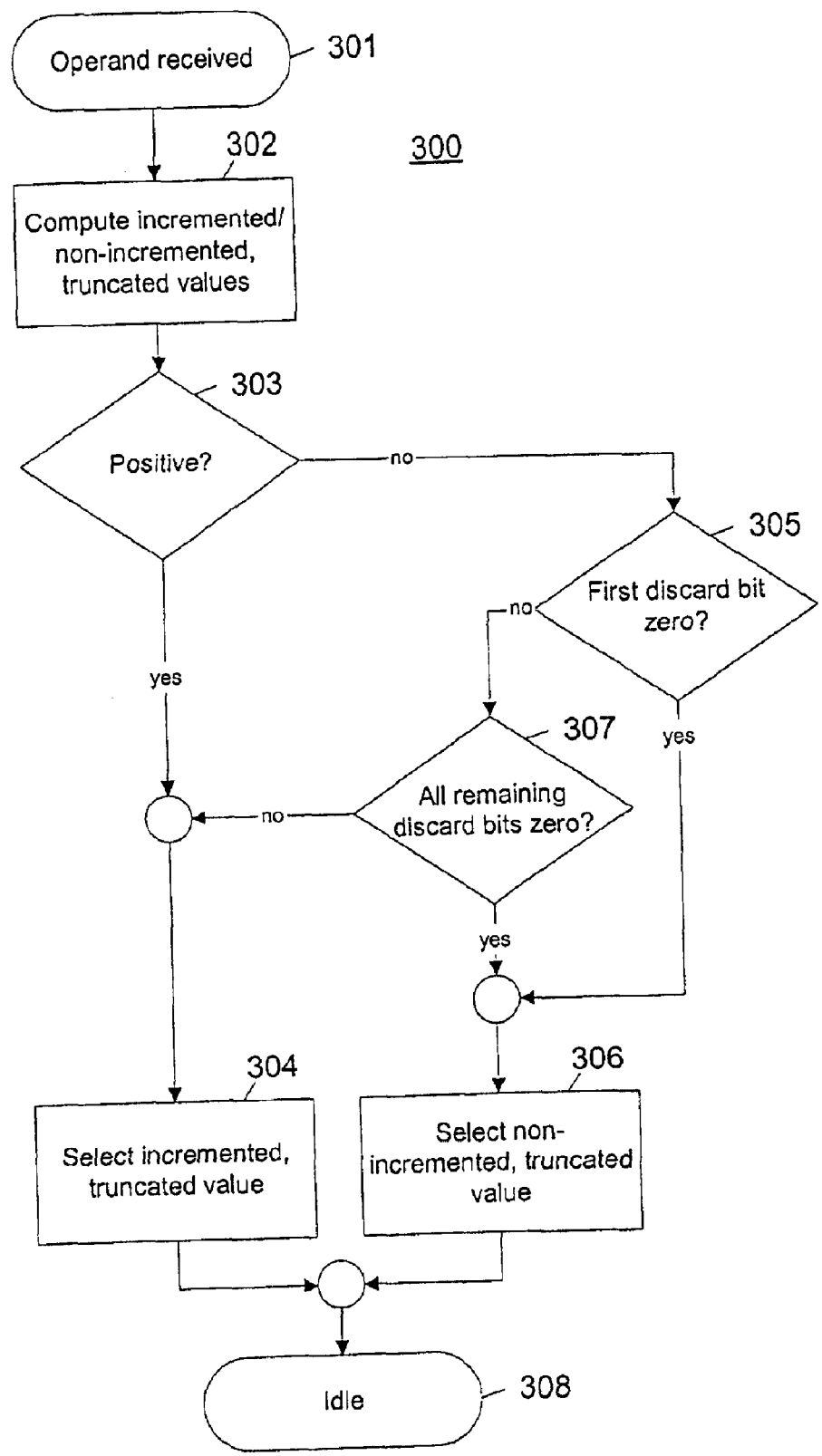
FIG. 3 depicts a high level flow chart for a process of performing round off without bias on twos complement binary data according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a wireless data transmission system in which round off without bias for twos complement binary data is implemented according to one embodiment of the present invention. Wireless data transmission system 100 includes a transmitter 101 and a receiver 102 coupled by a wireless communications link 103. Wireless communications link 103 may be an air interface communications channel in accordance with the known art. In the exemplary embodiment, transmitter 101 and receiver 102 are a high definition television (HDTV) transmitter and receiver, respectively. Alternatively, however, transmitter 101 and receiver 102 may be any transmitter/receiver employed within a wireless data transmission system (including voice, data or voice and data communications systems) in which round off is required during signal processing. As reflected by the exemplary embodiment, the present invention is particularly well suited to systems employing convolutional coding schemes.

As disclosed in further detail in U.S. Pat. No. 6,141,384, which is incorporated herein by reference, HDTV broadcast signals are trellis encoded in accordance with an eight-level (3 bit) one-dimensional constellation. Accordingly, receiver 102 includes a decoder 104 having one or more computation unit(s) which calculates a branch metric (distance) in each bit period between a received bit value and the bit values of all the trellis paths leading up to the code state existing during that bit period, as well as maintaining accumulated path metrics for each of the code states. Some of the calculations performed by these computation unit(s) require rounding of the result, which is performed as described in further detail below.

FIG. 2 illustrates in greater detail a circuit for performing round off without bias on twos complement binary data according to one embodiment of the present invention. In order to avoid distortion of the mean value of the data value being rounded, the rounded result is obtained by adding either 0 or 1 to the first bit to be discarded after rounding. The binary data value to be rounded is presented in twos complement form as

XXX . . . XXABB . . . BBB where the X's represent bit positions to be retained in the rounded result and the A and B's represent bit positions to be truncated during rounding, with A representing the first (most significant) bit position to be truncated or discarded in the rounded result. Each bit position (X, A or B) contains one of two logical values, either a one or a zero. As reflected by the format shown above, both the original binary data value and the rounded result may be of any size (any number of bit positions).

The value of the most significant bit—the leading X bit position—within data value designates the sign of the data value: zero in the most significant bit position designates a positive number, while one in the most significant bit position designates a negative number. If the binary data value is positive, the round off is performed by simply adding a one to the value within the A bit position:

*XXX ... XXA*

<u>      +1</u>

*YYY ... YY*

Where YYY . . . YY is the rounded result. Similarly, if the binary data value is negative and the value in the A bit position is one but the value of at least one of the B bit positions is also one, the rounded result is also YYY . . . YY. Optionally, the value of all B bits need not be considered in this instance. Instead, when the value of the A bit is one, consideration may be restricted to a limited number the (most significant) B bits (e.g., bits $B_1B_2$ of discard bits $AB_1B_2B_3B_4B_5B_6$) to save computational resources while limiting bias to an acceptable level.

If, however, the binary data value is negative and either (a) the value in the A bit position is zero or (b) the value in the A bit position is one but the values for all of the B bit positions are zero, then the round off is performed by simply truncating the A and B bit positions, producing a rounded result equal to XXX . . . XX.

In this manner, the mean value of the original twos complement binary data value is maintained in the rounded result, avoiding any offset or bias which might cause error in comparing the received data symbol to the expected symbol constellation diagram. The overall data stream has a mean value of zero before rounding, which must be maintained during rounding.

Any rounding mechanism will change the magnitude of an operand, assuming that at least some of the discarded bits are nonzero. Rounding algorithms and their impact on the data mean value may be categorized as follows:

| Round | Data mean value |
| --- | --- |
| Towards zero | Maintained |
| Away from zero | Maintained |
| Towards positive infinity | Biased towards positive infinity |
| Towards negative infinity | Biased towards negative infinity |

The present invention is an implementation of rounding away from zero which, if applied to a bipolar data stream with a non-zero mean value, might change the mean value of the data stream. However, when applied to bipolar data streams having an initial mean value of zero, as found in the coding systems mentioned above, the present invention maintains the mean value for the data stream since, when rounded using the present invention, values of the same magnitude but different signs will result in rounded numbers having the same absolute value.

For positive numbers, adding one to the value in the first discarded bit position A automatically increments the rounded result if the discarded bits ABB . . . BBB have a value of at least half the largest value which may be represented by those bits. For negative numbers, a determination must be made of whether the value of the discarded bits ABB . . . BBB is more than half the largest value which may be represented by those bits in determining whether to increment or truncate to produce the rounded result.

In implementing this round off mechanism, decoder 104 includes a computation unit 201 which produces the operand XXX . . . XXABB . . . BBB for the rounding operation. In the example shown, the values for bits XXX . . . XX are be passed directly to a multiplexer 202, and are also passed, together with the value for bit A, to an incrementer 203. Incrementer 201 increments the value of bits XXX . . . XXA to produce YYY . . . YY, which is also passed to the multiplexer 202. Multiplexer 202 may therefore be employed to selected either the value of bits XXX . . . XX with the values of bits ABB . . . BBB simply truncated, or the value of XXX . . . XXA with one added to the value in bit A. Select control logic 204 selects one of these two inputs to multiplexer 202 as the rounded result, receiving the most significant bit (MSB) and the values for bit positions ABB . . . BBB for use in determining which value to select.

FIG. 3 depicts a high level flow chart for a process of performing round off without bias on twos complement binary data according to one embodiment of the present invention. Flow chart 300 corresponds to the operation of the example circuit depicted in FIG. 2, although those skilled in the art will recognize that other implementations may be substituted and that the steps illustrated in FIG. 3 need not be performed in the precise sequence shown.

The process 300 begins with receipt of an operand of the type described above for rounding (step 301). Both incremented and non-incremented, truncated values are computed for the operand (step 302), where the incremented value is computed by adding one to the first (most significant) discard bit position before truncation of the discard bits, and the non-incremented, truncated value is computed by simply truncating the discard bits.

A determination is then made as to whether the received operand is positive (step 303). If so, the incremented, truncated value is selected (step 304). If not, however, a determination is made as to whether the first discard bit contains a zero (step 305). If the most significant discard bit is zero, the non-incremented, truncated value is selected (step 306).

If the first discard bit is non-zero, a determination is made as to whether all remaining discard bits are zero or non-zero (step 307). If all remaining discard bits (the discard bits other than the most significant discard bit) are all zero, the non-incremented, truncated value is selected (step 306). However, if any one of the remaining discard bits is non-zero, the incremented, truncated value is selected (step 304). The process then becomes idle (step 308) until another operand is received for rounding.

The present invention maintains the mean value for twos complement binary data during rounding, so that bias or offset in the rounded result does not interfere with processing received data symbols in relation to expected symbol constellation diagrams.

It is important to note that while the present invention has been described in the context of a fully functional hard-ware based system and/or network, those skilled in the art will appreciate that the mechanism of the present invention is capable of being distributed in the form of a machine usable medium containing instructions in a variety of forms, and that the present invention applied equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions and alterations herein may be made without departing from the spirit and scope of the invention in its broadest form.

What is claimed is:

1. A round off mechanism for maintaining a mean value of an operand comprising:

an incrementer for incrementing said operand at a most significant discard bit position to generate an incremented intermediate rounding result; and control logic controlling an output of said round off mechanism, said control logic causing said round off mechanism to produce a rounded result equal to either a remainder of said operand after truncation of bits within selected discard bit positions within said operand, said selected discard bit positions including said most significant discard bit position, or a remainder of said incremented intermediate rounding result after truncation of bits within said selected discard bit positions within said incremented intermediate result.

2. The round off mechanism as set forth in claim 1 wherein said control logic causes said round off mechanism to produce:

said remainder of said incremented intermediate result after said truncation of said bits within said selected discard bit positions as said rounded result when said operand is positive, or negative and contains a logical one within said most significant discard bit position and at least one other bit position within a selected number of the remaining most significant bits of said selected discard bit positions; and said remainder of said operand after said truncation of said bits within said selected discard bit positions as said rounded result when said operand is negative and contains a logical zero within said most significant discard bit position, or a logical one within said most significant discard bit position and logical zeros in all remaining discard bit positions.

3. The round off mechanism as set forth in claim 1 wherein said control logic causes said round off mechanism to select between said remainder of said operand after truncation of said bits within said selected discard bit positions, and said remainder of said incremented intermediate rounding result after said truncation of said bits within said selected discard bit positions as said rounded result.

4. The round off mechanism as set forth in claim 1 wherein said round off mechanism avoids any offset within said rounded result.

5. The round off mechanism as set forth in claim 1 wherein said round off mechanism computes both said remainder of said operand after truncation of said bits within said selected discard bit positions and said remainder of said incremented intermediate rounding result after said truncation of said bits within said selected discard bit positions for said operand, wherein said control logic causes said round off mechanism to select said remainder of said incremented intermediate rounding result after said truncation of said bits within said selected discard bit positions as said rounding result when said operand is positive, or negative and contains a logical one within said most significant discard bit position and at least one other bit position within a selected number of the remaining most significant bits of said selected discard bit positions, and said remainder of said operand after said truncation of said bits within said selected discard bit positions as said rounding result when said operand is negative and contains a logical zero within said most significant discard bit position, or a logical one within said most significant discard bit position and logical zeros in all remaining discard bit positions.

6. A receiver comprising:

a computation unit;

a round off mechanism receiving an operand from said computation unit and maintaining a mean value of said operand during rounding, said round off mechanism comprising:

an incrementer for incrementing said operand at a most significant discard bit position to generate an incremented intermediate rounding result; and control logic controlling an output of said round off mechanism, said control logic causing said round off mechanism to produce a rounded result equal to either a remainder of said operand after truncation of bits within selected discard bit positions within said operand, said selected discard bit including said most significant discard bit position, or a remainder of said incremented intermediate rounding result after truncation of bits within said selected discard bit positions within said incremented intermediate result.

7. The receiver as set forth in claim 6 wherein said control logic causes said round off mechanism to produce:

said remainder of said incremented intermediate rounding result after said truncation of said bits within said selected discard bit positions as said rounded result when said operand is
  positive, or
  negative and contains a logical one within said most significant discard bit position and at least one other bit position within a selected number of the remaining most significant bits of said selected discard bit positions; and said remainder of said operand after said truncation of said bits within said selected discard bit positions as said rounded result when said operand is negative and contains
  a logical zero within said most significant discard bit position, or
  a logical one within said most significant discard bit and logical zeros in all remaining discard bit positions.

8. The receiver as set forth in claim 6 wherein said control logic causes said round off mechanism to select between said remainder of said operand after truncation of said bits within said selected discard bit positions, and said remainder of said incremented intermediate rounding result after said truncation of said bits within said selected discard bit positions as said rounded result.

9. The receiver as set forth in claim 6 wherein said round off mechanism avoids any offset within said rounded result.

10. The receiver as set forth in claim 6 wherein said round off mechanism computes both said remainder of said operand after truncation of said bits within said selected discard bit positions and said remainder of said incremented intermediate rounding result after said truncation of said bits within said selected discard bit positions for said operand, wherein said control logic causes said round off mechanism to select
  said remainder of said incremented intermediate rounding result after said truncation of said bits within said selected discard bit positions as said round result when said operand is
    positive, or
    negative and contains a logical one within said most significant discard bit position and at least one other bit position within a selected number of the remaining most significant bits of said selected discard bit positions, and
  said remainder of said operand after said truncation of said bits within said selected discard bit positions as said rounded result when said operand is negative and contains
    a logical zero within said most significant discard bit position, or
    a logical one within said most significant discard bit position and logical zeros in all remaining discard bit positions.

11. A method of maintaining a mean value of an operand during rounding comprising:

incrementing the operand at a most significant discard bit position using an incrementer to generate an incremented intermediate rounding result; and producing a rounded result equal to either
  a remainder of the operand after truncation of bits within selected discard bit positions within the operand, the selected discard bit positions including the most significant discard bit position, or
  a remainder of the incremented intermediate rounding result after truncation of bits within the selected discard bit positions within the incremented intermediate result.

12. The method as set forth in claim 11 wherein the step of producing a rounded result further comprises:

producing the remainder of the incremented intermediate rounding result after the truncation of the bits within the selected discard bit positions as the rounded result when the operand is
  positive, or
  negative and contains a logical one within the most significant discard bit position and at least one other bit position within a selected number of the remaining most significant bits of the selected discard bit positions; and producing the remainder of the operand after the truncation of the bits within the selected discard bit positions as the rounded result when the operand is negative and contains
  a logical zero within the most significant discard bit position, or
  a logical one within the most significant discard bit position and logical zeros in all remaining discard bit positions.

13. The method as set forth in claim 11 wherein the step of producing a rounded result further comprises:

selecting between the remainder of the operand after truncation of the bits within the selected discard bit positions and the remainder of the incremented intermediate rounding result after the truncation of the bits within the selected discard bit positions.

14. The method as set forth in claim 11 wherein the step of producing a rounded result avoids any offset within the rounded result.

15. The method as set forth in claim 11 wherein the step of producing a rounded result further comprises:

computing both the remainder of the operand after truncation of the bits within the selected discard bit positions and the remainder of the incremented intermediate rounding result after the truncation of the bits within the selected discard bit positions for the operand;

selecting the remainder of the incremented intermediate rounding result after the truncation of the bits within the selected discard bit positions as the rounded result when the operand is
  positive, or
  negative and contains a logical one within the most significant discard bit position and at least one other bit position within a selected number of the remaining most significant bits of the selected discard bit positions; and selecting the remainder of the operand after the truncation of the bits within the selected discard bit positions as the rounded result when the operand is negative and contains a logical zero within the most significant discard bit position, or a logical one within the most significant discard bit position and logical zeros in all remaining discard bit positions.

16. A computer program product within a computer usable medium for maintaining a mean value of an operand during rounding comprising:

instructions for incrementing the operand at a most significant discard bit position to generate an incremented intermediate rounding result; and instructions for producing a rounded result equal to either
a remainder of the operand after truncation of bits within selected discard bit positions within the operand, the selected discard bit positions including the most significant discard bit position, or
a remainder of the incremented intermediate rounding result after truncation of bits within the selected discard bit positions within the incremented intermediate result.

17. The computer program product as set forth in claim 16 wherein the instructions for producing a rounded result further comprise:

instructions for producing the remainder of the incremented intermediate rounding result after the truncation of the bits within the selected discard bit positions as the rounded result when the operand is
positive, or
negative and contains a logical one within the most significant discard bit position and at least one other bit position within a selected number of the remaining most significant bits of the selected discard bit positions; and instructions for producing the remainder of the operand after the truncation of the bits within the selected discard bit positions as the rounded result when the operand is negative and contains
a logical zero within the most significant discard bit position, or
a logical one within the most significant discard bit position and logical zeros in all remaining discard bit positions.

18. The computer program product as set forth in claim 16 wherein the instructions for producing a rounded result further comprise:

instructions for selecting between the remainder of the operand after truncation of the bits within the selected discard bit positions and the remainder of the incremented intermediate rounding result after the truncation of the bits within the selected discard bit positions.

19. The computer program product as set forth in claim 16 wherein the instructions for producing a rounded result avoid any offset within the rounded result.

20. The computer program product as set forth in claim 16 wherein the instructions for producing a rounded result further comprise:

instructions for computing both the remainder of the operand after truncation of the bits within the selected discard bit positions and the remainder of the incremented intermediate rounding result after the truncation of the bits within the selected discard bit positions for the operand;

instructions for selecting the remainder of the incremented intermediate rounding result after the truncation of the bits within the selected discard bit positions as the rounded result when the operand is
positive, or
negative and contains a logical one within the most significant discard bit position and at least one other bit position within a selected number of the remaining most significant bits of the selected discard bit positions; and instructions for selecting the remainder of the operand after the truncation of the bits within the selected discard bit positions as the rounded result when the operand is negative and contains
a logical zero within the most significant discard bit position, or
a logical one within the most significant discard bit position and logical zeros in all remaining discard bit positions.

* * * * *